OR 3,614,206

United States P [11] 3,614,206

| [72] | Inventor | Thomas A. Kenney |
| | | Hull, Mass. |
| [21] | Appl. No. | 21,951 |
| [22] | Filed | Mar. 23, 1970 |
| [45] | Patented | Oct. 19, 1971 |
| [73] | Assignee | Kenzdof Incorporated |
| | | Hull, Mass. |

[54] APPARATUS FOR PHOTOGRAPHY
5 Claims, 3 Drawing Figs.

[52] U.S. Cl. ............................................. 350/179, 350/188, 350/204
[51] Int. Cl. ............................................. G02b 1/06
[50] Field of Search .............................. 350/179, 188, 204

[56] References Cited
UNITED STATES PATENTS

| 695,606 | 3/1902 | Grun | 350/179 |
| 3,049,054 | 8/1962 | Waland | 350/179 |
| 3,111,570 | 11/1963 | Strong et al. | 350/204 X |

*Primary Examiner*—David Schonberg
*Assistant Examiner*—Paul A. Sacher
*Attorney*—Norman S. Blodgett ABSTRACT: Apparatus for photography including solid plates of optically clear material arranged closely together with a very thin layer of liquid between.

PATENTED OCT 19 1971

3,614,206

THOMAS A. KENNEY
INVENTOR.

BY
Norman S. Blodgett
ATTORNEY

APPARATUS FOR PHOTOGRAPHY

BACKGROUND OF THE INVENTION

In the art of photography, many attempts have been made to produce pictures which, when projected, give the effect of depth or three dimensions. Another effect that has always been sought is that of "presence," i.e., the feeling while viewing a projected picture of actually being in the picture. Devices for accomplishing these functions have been very complex and expensive and have been difficult to maintain in operative condition. Some methods require the use of special glasses, while others require a special theatre, or special projection equipment. These and other difficulties experienced with the prior art devices have been obviated in a novel manner by the present invention.

It is, therefore, an outstanding object of the invention to provide apparatus for photography for obtaining pictures, which, when projected, give an illusion of depth.

Another object of this invention is the provision of a photographic device for producing a projectable picture producing a three dimensional effect.

A further object of the present invention is the provision of a camera element particularly for producing "presence" in motion pictures without using complex equipment.

It is another object of the instant invention to provide a camera attachment for producing projectable pictures of excellent quality, which attachment is simple in construction, inexpensive to manufacture, and which is capable of a long life of useful service with a minimum of maintenance.

A still further object of the invention is the provision of a camera element which reduces criticality of focus, gives softer color, and a more natural picture.

It is a further object of the invention to provide a camera device permitting adequate color film exposure at lower than normal lens openings and broadens the depth of field of the lens with which it is associated.

It is a still further object of the present invention to provide an attachment for use with a colored motion-picture camera which assures that clearness of focus remains the same from frame to frame.

With these and other objects in view, as will be apparent to those skilled in the art, the invention resides in the combination of parts set forth in the specification and covered by the claims appended hereto.

SUMMARY OF THE INVENTION

In general, the invention consists of an apparatus for photography having a hollow housing and having a plurality of optically clear solid elements mounted in the housing transversely thereof and generally parallel to one another. A liquid having approximately the same index of refraction as the elements is located between the solid elements, and means is provided for holding the solid elements in the housing and sealing against loss of the fluid.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
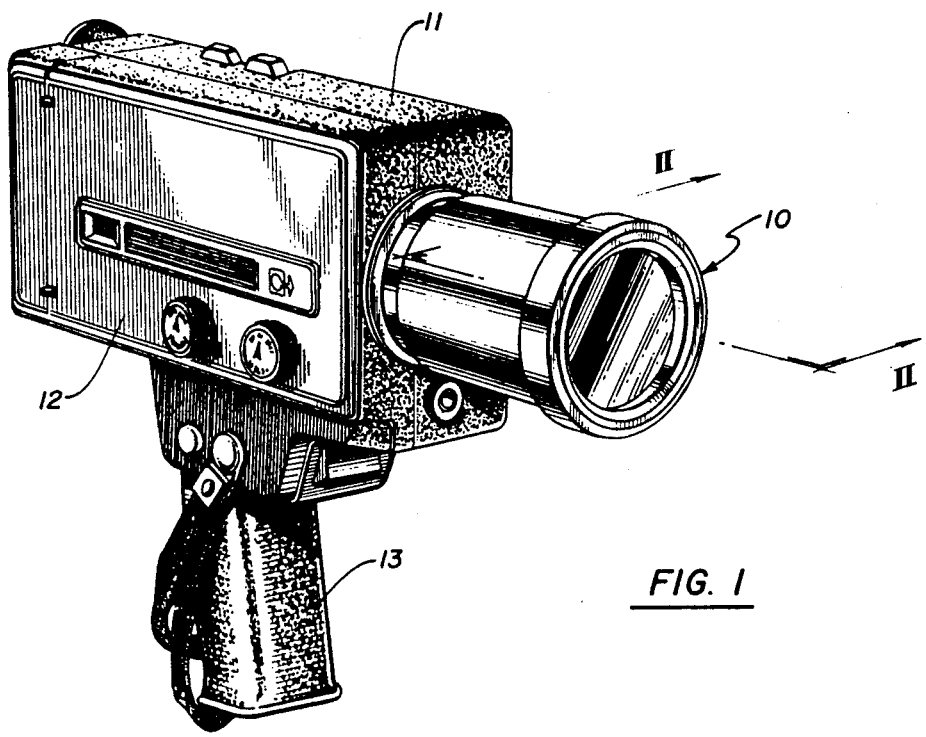
FIG. 1 is a perspective view of an apparatus for photography embodying the principles of the present invention.

Referring first to FIG. 1, wherein are best shown the general features of the invention, the apparatus, indicated generally by the reference numeral 10, is shown in use with a motion-picture camera 11. The camera is of the type used in producing colored motion-pictures, having a main housing 12 which can be held by a handle 13, and on the front of which is a lens system 14 having a barrel 15 with a cylindrical outer surface. The apparatus 10 is carried on the barrel 15 in engagement with that surface.

Figure 2:
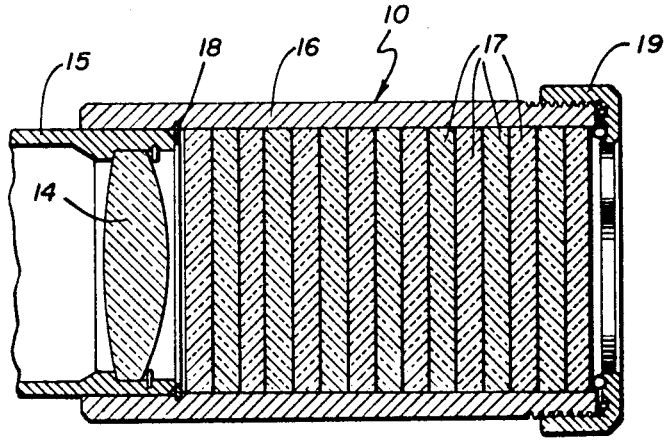
FIG. 2 is a sectional view of the apparatus taken on the line II—II of FIG. 1.

In FIG. 2 it can be seen that the apparatus is provided with a hollow housing 16 of tubular form with a circular cross section whose inner diameter is of a size to fit snugly over the surface 15, so that the housing is held coaxially of the lens system. In the housing are carried a plurality of optically clear solid elements 17; the elements are glass discs of such a diameter as to fit closely in the housing transversely thereof and their thicknesses are approximately equal. Lying between the adjacent surface of the elements 17 is a liquid having approximately the samd index of refraction as the elements themselves; in the preferred embodiment, this liquid is glycerin. As is evident in the drawing, the elements or glass plates are arranged very closely together with the fluid in a very thin layer between them; as a matter of fact, the fluid is squeezed into of molecular layer of molecular thickness. At the lens system end of the housing a snap ring 18 lies in an internal groove provided therefor; a rubber O-ring lies between the inner radial surface of the ring and the surface of the last element 17. The opposite radial surface of the ring engages the end of the barrel 15 of the lens system.

Figure 3:
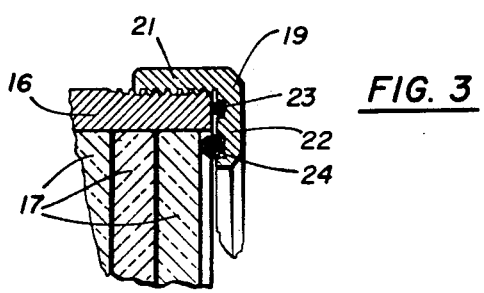
FIG. 3 is an enlarge view of a portion of the invention.

FIG. 3 shows the manner in which the outer end of the housing is provided with a cap 19. An axially extending tubular portion 21 of the cap is threadedly engaged with the housing, while a radially extending flange 22 serves to lock the elements in place. A rubber O-ring 23 is carried in a groove formed on the inner face of the flange and engages the radial end surface of the housing. Similarly, a relatively large rubber O-ring 24 is carried in another annular groove formed in the flange; this O-ring engages the outwardly facing surface of the last element 17. The rotation of the cap 19 permits the O-ring 24 to engage the elements 17 with considerable clamping force to squeeze them together and reduce the fluid film between the elements almost to molecular thickness. At the same time, this clamping force deforms the sealing O-rings and assures against escape and loss of fluid.

The operation of the invention will now be readily understood in view of the above description. With the apparatus mounted on the camera 11, the motion-picture film is exposed frame-by-frame in the usual way. When the film has been developed and is projected on a screen, a number of advantages become evident, particularly when the film used is colored 35 mm. and the image is projected on a large screen. The first impression that one receives is that the color is softened (less saturated) and is not so harsh on the eyes. The artistic effect is much more pleasing and the reproduction is more natural. Apparently, the depth of field is increased, i.e., the range of objects that are in focus at a selected f. ratio is greater. An observation of the film shows that the selection of exposure is not as critical; with a given exposure setting, it is possible to take acceptable pictures with less light. That is to say, the lens opening can be stopped down (larger f. ratio). When the film is examined frame-by-frame, it is evident that all frames are in focus, whereas, probably due to camera vibration, it has been found in the past that the perfectly focused frame occurs only occasionally and the intervening frames are out of focus. Finally, the projected image exhibits to a high degree the effect known as "presence" and to some degree a feeling of depth or a three-dimensional effect. Particularly, where landscapes are concerned, subjects in the foreground appear distinctly closer to the observer, while subjects in the background are rendered softer in appearance, as is true in the case of the human eye observing the actual scene.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Apparatus for photography, comprising a. a hollow housing,
b. a plurality of optically clear solid elements mounted in the housing transversely thereof and generally parallel to one another,
c. a liquid having approximately the same index of refraction as the said elements located between the said solid elements, and
d. means holding the solid elements in the housing and sealing against loss of the fluid, the solid elements being in the form of plates arranged closely together, with the fluid in a very thin layer between them.

2. Apparatus as recited in claim 1, wherein the fluid is squeezed into a layer of molecular thickness.

3. Apparatus as recited in claim 1, wherein the housing is in the form of a tube of circular cross section having at one end a provision for attachment to the lens system of a conventional camera.

4. Apparatus as recited in claim 1, wherein the fluid is substantially glycerin.

5. Apparatus as recited in claim 1, wherein the solid elements are formed of glass.